United States Patent
Cheung (10) Patent No.: US 8,473,211 B2
(45) Date of Patent: Jun. 25, 2013

(54) METHODS OF CORRECTING ACCELEROMETER AND MAGNETOMETER MEASUREMENTS

(75) Inventor: Philip Cheung, Montesson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 475 days.

(21) Appl. No.: 12/099,854

(22) Filed: Apr. 9, 2008

(65) Prior Publication Data

US 2009/0157341 A1    Jun. 18, 2009

(30) Foreign Application Priority Data

Apr. 17, 2007 (EP) ................... 07106321

(51) Int. Cl.
   *G01V 3/18* (2006.01)
(52) U.S. Cl.
   USPC ............... 702/6; 702/85; 702/141; 324/301; 324/346; 324/303; 324/244
(58) Field of Classification Search
   USPC ............ 702/6, 85, 141; 324/301, 346, 303, 324/244
   See application file for complete search history.

(56) References Cited

U.S. PATENT DOCUMENTS

| 6,179,067 B1 | 1/2001 | Brooks |
| 6,966,211 B2 * | 11/2005 | Wu ............... 73/1.75 |

FOREIGN PATENT DOCUMENTS

| EP | 0384537 | 8/1990 |
| WO | 02/50400 | 6/2002 |
| WO | 2005/124102 | 12/2005 |

* cited by examiner

*Primary Examiner* — Jonathan C Teixeira Moffat
*Assistant Examiner* — Hyun Park
(74) *Attorney, Agent, or Firm* — Stephanie Chi; Darla Fonseca; Jody DeStefanis (57) ABSTRACT

A method of correcting accelerometer and magnetometer measurements made in a well is provided. The method includes making a series of triaxial measurements with magnetometers and accelerometers in an interval of the well to derive measured values of gravitational acceleration g, magnetic filed intensity B, and the sine of the magnetic inclination sin I. The method also includes obtaining known values of g, B and sin I for the interval and determining values of a correction to be applied to the measured values by simultaneously minimizing the difference between the measured values and the known values of g, B and sin I for the interval. The method also includes applying the correction to the measured values to obtain in situ corrected values for g, B and sin I.

1 Claim, 5 Drawing Sheets

METHODS OF CORRECTING ACCELEROMETER AND MAGNETOMETER MEASUREMENTS

TECHNICAL FIELD

This invention relates to methods for correcting accelerometer and magnetometer measurements. In particular, the method relates to in situ correction of offsets in such measurements made in oil or gas wells or the like.

BACKGROUND ART

Tri-axial accelerometers and magnetometers are widely used in oil and gas well characterization to measure the components of gravitational acceleration g and the terrestrial magnetic field intensity B in a tool coordinate system.

In the context of measurement tools such as wireline-conveyed tools, g is obtained simply as $(A_x, A_y, A_z)$ where the A's are the readings of the accelerometers along the reference axes of the tool, after correction for tool acceleration. Since the tool is typically moving during a log, the accelerometer readings are low-pass filtered to remove the effects of irregular tool motion, isolating thereby the component due to gravity. The filtering can be made on the z-accelerometer readings directly. For the x- and y-accelerometers, allowance is made for tool rotation, i.e. within the filter window, the x- and y-sensors axes are not fixed relative to the gravitational field.

In the absence of stray fields caused by magnetization of tool components and material in the borehole, the magnetometer readings give B directly as $(M_x, M_y, M_z)$.

By convention, the tool z-axis is the long axis of the tool, which corresponds to the borehole axis after correction for differential standoffs at the extremities of the sonde. The tool x-axis is the direction of a reference marker in the plane perpendicular to the z-axis. This reference is often called 'P1' or 'Pad 1', since in multi-pad tools, the center of the pad designated as pad 1 would be aligned to the reference marker.

The output of interest of the triaxial accelerometers and magnetometers is the tool orientation expressed in terms of the tool angles.

Figure 1:
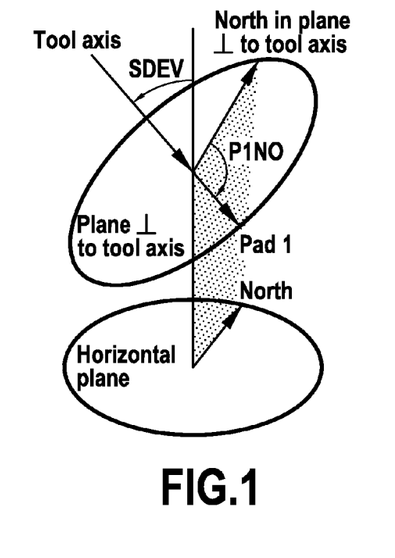
FIGS. 1 and 2 show schematic diagrams indicative of tool angles.
Figure 2:
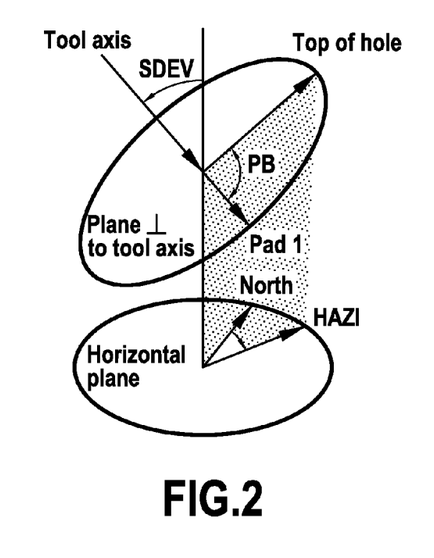

The orientation of the tool in the geographical coordinate system is described by the following angles (and illustrated in FIGS. 1 and 2):

Sonde Deviation (SDEV): the angle from the downward vertical to the tool z-axis (FIGS. 1 and 2);
Sonde or Hole Azimuth (HAZI): the angle in the horizontal plane from True North to the projection of the tool z-axis on the horizontal plane (FIG. 2);
Rotation of P1 from top-of-hole (a.k.a. 'relative bearing' RB): the angle in the xy-plane of the tool, from the top-of-hole direction to the reference P1 (FIG. 2); and
Rotation of P1 from North (P1NO): the angle in the xy-plane of the tool, from the North direction to the reference P1 (FIG. 1).

HAZI, RB and P1NO can be undefined under the following circumstances:

1. If the hole is vertical, top-of-hole, defined as the direction of steepest ascent in the tool plane (plane perpendicular to the tool axis), is undefined. Consequently, the tool angles RB and HAZI are undefined.
2. The North direction in the tool plane is defined by the intersection of the tool plane with the vertical plane in the North-South direction. If the tool axis is horizon and pointing East or West, then the tool plane is parallel to the N-S vertical plane, so North in the tool plane, and hence P1NO, are undefined.
3. East and North are defined in terms of g and B as the directions of the vectors g×B and (g×B)×g, plus a rotation in the horizontal plane equal to the magnetic declination. At the magnetic poles, B is vertical so East and North, and consequently HAZI and P1NO, are undefined.

To avoid these singularities, it is common practice to use P1NO for subvertical, and RB for deviated and horizontal wells. With regards to large magnetic inclination, an operational limit is usually placed on the tools for magnetic latitude L<70°, i.e. I<80° (since tan I=2 tan L when the Earth magnetic field is approximated as dipolar).

The tool angles are related to the basic measurements of the tri-axial sensors according to the formulae:

$-SDEV = a\tan 2[\sqrt{(a_x^2+a_y^2)}, a_z]$ $-HAZI = a\tan 2[a_x m_y - a_y m_x, m_z - a_z \sin I] + D$ $-RB = a\tan 2[a_y, -a_x]$ $-P1NO = a\tan 2[\cos D(a_y m_z - a_z m_y) + \sin D(m_x - a_x \sin I), \cos D(a_z m_x - a_x m_z) + \sin D(m_y - a_y \sin I)]$ where $(a_x, a_y, a_z) = (A_x, A_y, A_z)/\sqrt{(A_x^2 + A_y^2 + A_z^2)}$, $(m_x, m_y, m_z) = (M_x, M_y, M_z)/\sqrt{(M_x^2 + M_y^2 + M_z^2)}$, D is the magnetic deviation that must be known a priori, and sin I is the sine of the magnetic inclination measured as: $\sin I = a_x m_x + a_y m_y + a_z m_z$.

The ideal tri-axial instrument would have sensors that
1. output a reading equal to the field component parallel to the sensor axis, and
2. are aligned perfectly in parallel with the orthogonal tool reference axes.

In practice, a given instrument must be calibrated to eliminate systematic deviations from the ideal. If the response of a sensor is assumed to be linear, then each sensor in a triaxial system is characterized by four calibration parameters:
a scaling factor,
an offset (bias),
two misalignment angles giving the deviation of the sensor axis from the two tool axes to which it is supposedly at 90°.

At a given temperature, the parameters can be determined using the Total Field Method of Estes and Walters (Estes, R. and Walters, P., 1969, 'Improvement of Azimuth Accuracy by Use of Iterative Total Field Calibration Technique and Compensation for System Environment Effects', SPE 19546). For a tool consisting of triaxial accelerometers and magnetometers, there are 24 calibration parameters at a given temperature. A full calibration determines these parameters at several temperatures, covering the operational temperature range of the tool, so that their variation with temperature can be accounted for by interpolation. A full calibration is carried out at surface periodically. More frequently, a calibration 'check' is made at ambient temperature to ensure that the tools remain in calibration.

The Total Field Method is applied independently to the triaxial accelerometers and magnetometers. In an environment where the field F (g or B) is uniform and constant, and the magnitude |F| is known, the triaxial sensors (accelerometers or magnetometers) are oriented in a number of positions so that each individual sensor is exposed to field values covering the entire range of possible values from −|F| to +|F|. These positions are conveniently obtained by rotating the tool about its x-, y- and z-axes, with the rotation axis aligned approximately East-West. At each position, the corrected measured field components and |F| can be computed using trial values of the calibration parameters. The true values of the calibration parameters are then determined as the values which:

1. minimize the rms difference between the $|F|_{Corrected}$ values and the known value of |F|, and
2. render $F_{\alpha Corrected}$=constant, for the points obtained by rotation about the α-axis.

After calibration, the remaining uncertainty in the measurements can be characterized by the standard deviation, respectively $\sigma_A$ and $\sigma_M$ for the individual accelerometers and magnetometers. Typical values for $\sigma_A$ and $\sigma_M$ are 0.02 m/s$^2$, and 150 nT respectively at a frequency of 15 Hz and inclusive of electronics noise, for avionic grade instruments. For g=9.80 m/s$^2$ and B~50000 nT, the uncertainties in the measured direction of g and B would be 0.1° and 0.2° respectively as indicated by the schematic in FIG. 3.

Figure 3:
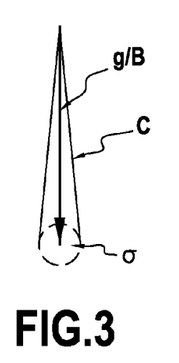
FIG. 3 shows a schematic diagram indicating uncertainties in measurements.

In FIG. 3, the thick arrow represents the field vector g or B. In three dimensions, the measured values of the vector falling within σ of the true value are enclosed in a sphere (shown in dotted line) with radius σ. The standard deviation in the direction of the vector would therefore be equal to the half-angle of the cone C subtended by the sphere. In the case of g, the half angle of the cone is $\sigma_A/|g|$=0.002 radians, or 0.1°.

In fact when logging, the magnetometer measurements are typically averaged over four samples, and the accelerometer measurements are effectively averaged over 36 samples in the lowpass filter to remove tool acceleration. Taking the averaging into account, we can write, for typical wireline logs:

$$\sigma^*_A = (\sigma_A/g)/\sqrt{36} \sim 0.0003$$

$$\sigma^*_M = (\sigma_M/B)/\sqrt{4} \sim 0.0015$$

where the σ*'s are expressed as fractions of the field magnitudes.

Various methods have been proposed for correcting accelerometer and magnetometer measurements. For example, U.S. Pat. No. 6,179,067 describes methods for determining magnetometer errors during wellbore survey operations in which a model is used to correct the observed data and the corrected data are transformed from the tool coordinate system to a different coordinate system referenced to the earth. The difference between the corrected transformed data and reference data in the earth coordinate system is minimized to determine the model parameters.

The present invention provides a procedure that can be used to quality control and correct for offsets in the wireline triaxial accelerometer and magnetometer measurements in situ. i.e. using data acquired during a log to correct the offsets as they existed during the log.

DISCLOSURE OF THE INVENTION

This invention provides a method of correcting accelerometer and magnetometer measurements made in a well, comprising:
making a series of triaxial measurements with magnetometers and accelerometers in an interval of the well to derive measured values of gravitational acceleration g, magnetic filed intensity B and the sine of the magnetic inclination sin I;
obtaining known values of g, B and sin I for the interval;
determining values of a correction to be applied to the measured values by simultaneously minimising the difference between the measured values and the known values of g, B and sin I for the interval; and
applying the correction to the measured values to obtain in situ corrected values for g, B and sin I.

Preferably, the method further comprises correcting the measured values of g, B and sin I using predefined calibration parameters to provide calibration corrected measured values and applying the correction to the calibration corrected values to obtain in situ corrected values for g, B and sin I.

The measurements are typically made in a downhole tool that is placed in the well, the predefined calibration parameters being stored in the tool and applied when the measurements are made.

The difference minimised is preferably the rms difference between the measured and known values.

Where the corrected accelerometer and magnetometer readings are given by $$A' = A - \Delta A = (A_x - \Delta A_x, A_y - \Delta A_y, A_z - \Delta A_z),$$

$$M' = M - \Delta M = (M_x - \Delta M_x, M_y - \Delta M_y, M_z - \Delta M_z),$$

and the measured values of g, B and sin I by $$|A'| = \sqrt{(A'^2_x + A'^2_y + A'^2_z)},$$

$$|M'| = \sqrt{(M'^2_x + M'^2_y + M'^2_z)}, \text{ and}$$

$$A' \cdot M'/|A'||M'|,$$

the method comprising determining offsets $\Delta A = (\Delta A_x, \Delta A_y, \Delta A_z)$ and $\Delta M = (\Delta M_x, \Delta M_y, \Delta M_z)$ that will simultaneously minimize the root-mean-square difference between the measured and known values of g, B and sin I.

The offsets $\Delta A$ and $\Delta M$ can then be obtained by minimizing the cost function:

$$\chi = \sigma^{*2}_g + \sigma^{*2}_B + \sigma^2_{\sin I} + \Lambda^2_A + \Lambda^2_M$$

where $$\sigma^*_g = \sqrt{[\Sigma(1-|A'|/g)^2/N]},$$

$$\sigma^*_B = \sqrt{[\Sigma(1-|M'|/B)^2/N]},$$

$$\sigma_{\sin I} = \sqrt{[\Sigma(\sin I - A' \cdot M'/|A'||M'|)^2/N]},$$

(Σ represents a sum over N depth levels)
are the standard deviation of the measured g, B and sin I and * indicates that the values are expressed as fractions of the reference values, and the terms:

$$\Lambda^2_A = (a_g \sigma^*_{g\ Theoretical}/\sigma^*_g)^2 |\Delta A|^2/g^2,$$

and $$\Lambda^2_M = (a_B \sigma^*_{B\ Theoretical}/\sigma^*_B)^2 |\Delta M|^2/B^2$$

are included so that if two solutions give the same fit according to the $\sigma^*_g$, $\sigma^*_B$ and $\sigma_{\sin I}$ terms, the one whose offset vector has the smaller magnitude is preferred.

The interval over which measurements are taken is selected such that the measured parameters are substantially constant.

Other aspects of the invention will be apparent from the detailed description below.

MODE(S) FOR CARRYING OUT THE INVENTION

Experience shows that, during wireline accelerometer and magnetometer measurements, the scaling factors and misalignment angles of the sensors rarely change during a log, and if changes occur (e.g. due to a very severe shock), they are persistent and so detectable in a post-job or periodic calibration check at surface. Changes to the sensor offsets, on the other hand, are relatively frequent, and often dependent on environmental factors (e.g. magnetization 'hot-spots' in the toolstring created by passing through a strongly magnetized casing, or vibrations during transportation). As a result, offsets measured at surface do not always correspond to the offsets that exist during the log. In other words, the offsets, and only the offsets need to be corrected in-situ.

An example of in-situ offset correction provided by the present invention works as follows. During a log, the raw measurements are corrected in real-time using the calibration parameters determined during a full calibration at surface, and stored in the EPROM of the tool. After the log, the in-situ offset correction can be applied using the data acquired.

The method to estimate and correct the sensor offsets is similar in spirit to the Total Field method for calibration. In a typical logging run, the tool will be exposed to a limited range of orientations so that a given sensor will only read field values in a restricted range of all possible values. It is therefore impossible to perform a proper calibration of the sensors as described above. However, except in the most exceptional cases (e.g. in a straight hole where the tool does not rotate), there is sufficient information to estimate the offsets of the sensors.

The method according to the invention comprises determining the values of the offsets $\Delta A = (\Delta A_x, \Delta A_y, \Delta A_z)$ and $\Delta M = (\Delta M_x, \Delta M_y, \Delta M_z)$ that will simultaneously minimize the root-mean-square difference between the measured and known values of g, B and sin I where I is the magnetic inclination I in an interval where these parameters are constant. In practice, this means the entire logged interval, excluding roughly 50 m of data below casing.

First, the corrected accelerometer and magnetometer readings may be written as:

$$A' = A - \Delta A = (A_x - \Delta A_x, A_y - \Delta A_y, A_z - \Delta A_z),$$

$$M' = M - \Delta M = (M_x - \Delta M_x, M_y - \Delta M_y, M_z - \Delta M_z),$$

and the measured values of g, B and sin I respectively as:

$$|A'| = \sqrt{(A'^2_x + A'^2_y + A'^2_z)},$$

$$|M'| = \sqrt{(M'^2_x + M'^2_y + M'^2_z)},$$

and $$A' \cdot M'/|A'||M'|.$$

The offsets $\Delta A$ and $\Delta M$ can then be obtained by minimizing the cost function:

$$\chi = \sigma^{*2}_g + \sigma^{*2}_B + \sigma_{\sin I}^2 + \Lambda_A^2 + \Lambda_M^2$$

where $$\sigma^*_g = \sqrt{[\Sigma(1 - |A'|/g)^2/N]},$$

$$\sigma^*_B = \sqrt{[\Sigma(1 - |M'|/B)^2/N]},$$

$$\sigma_{\sin I} = \sqrt{[\Sigma(\sin I - A' \cdot M'/|A'||M'|)^2/N]},$$

($\Sigma$ represents a sum over N depth levels) are the standard deviation of the measured g, B and sin I and * indicates that the values are expressed as fractions of the reference values.

The terms:

$$\Lambda^2_A = (a_g \sigma^*_{g\ Theoretical}/\sigma^*_g)^2 |\Delta A|^2/g^2,$$

and $$\Lambda^2_M = (a_B \sigma^*_{B\ Theoretical}/\sigma^*_B)^2 |\Delta M|^2/B^2,$$

have been introduced into $\chi$ so that if two solutions (without these terms) give the same fit, the one whose offset vector has the smaller magnitude is preferred. The theoretical minimum values $\sigma^*_{g\ Theoretical}$ and $\sigma^*_{B\ Theoretical}$ are in fact $\sigma^*_A$ and $\sigma^*_M$. $a_g$, $a_B$ are numerical constants (see below). The factors $(a\sigma^*_{Theoretical}/\sigma^*)^2$ ensure that these terms come into play only when $\sigma$ is reduced to a size comparable to $a\sigma^*_{Theoretical}$, i.e. the $\Lambda$ terms influence the minimization only when $\sigma^*$ is at, or has been reduced to, an insignificant level. This procedure works well in the sense that one set of $a_g$ and $a_B$ values has been found to give good results for a large number of datasets. In contrast, the usual method of weighing the $\sigma^{*2}_g$, $\sigma^{*2}_B$, $\sigma_{\sin I}^2$ terms in the $\chi$ according to their expected variance, does not work well in log examples, in that a single set of weights cannot be found to give good results for all data.

The method assumes that g, B and I are constants along the well trajectory, and their values are known to the theoretical minimum $\sigma$, i.e. $\pm 0.003$ m/s$^2$ for g, $\pm 75$ nT for B, and $\pm 0.1$ deg for I. The value of g given by the latitude formula at zero altitude (see NPL (National Physical Laboratory) website: http://www.npl.co.uk/pressure/faqs/altgrav.html) and the values of B and I given by the International Geomagnetic Model (IGM) as functions of location and date, are sufficiently accurate. (See Williamson, H. S., 2000, 'Accurate prediction for Directional Measurement While Drilling', SPE Drilling and Completion, 15 (4), December 2000) for error magnitudes that would arise when using a global geomagnetic model.) Of course, values from local surveys can be used if available.

The minimization problem can be solved in seconds on a PC with an algorithm such as that of Nelder, J. A. and Mead, R., 1965, 'A simplex method for function minimization', The Computer Journal, vol 7, 308-313.

The method presented above differs in varying degree from the many methods that are used to improve MWD surveys. While the method of U.S. Pat. No. 6,179,067 proposes correction all six sensors simultaneously using multi-station data and a least squares minimization technique. Experience with wireline data shows that only the offsets can be computed, and sin I must also be used as external reference. This is particularly the case if a robust, automatic method (with no parameter adjustment) that would work in almost every well is sought.

In one example of the invention, two tools are run in the same toolstring, adjacent to each other and connected rigidly.

Tool A is a standard commercial tool and B is a prototype in which magnetic hot spots may exist. Tool B was calibrated a month or so before the log, and tool A was calibrated at least 12 months earlier. The well is nearly vertical (max deviation ~3°). The value of g=9.791 m/s² was computed using the latitude formula, and the values of B=47630 nT and I=57.7° are taken from the IGM.

This example aims to see if after correction, the two sets of measurements agree to within expectation. Running two tools of the same type on the same toolstring offers the advantage that the measurements are made under exactly the same conditions.

Table 1 gives the sensor offsets computed by minimization for the tools A and B over an interval of 500 m.

TABLE 1

| Tool | $\Delta A_x$ | $\Delta A_y$ m/s² | $\Delta A_z$ | $\Delta M_x$ | $\Delta M_y$ nT | $\Delta M_z$ |
|---|---|---|---|---|---|---|
| A | −0.009 | 0.003 | −0.025 | +299 | +84 | +157 |
| B | 0.007 | −0.001 | −0.005 | −282 | −337 | −605 |
| | | $\sigma^*_A$ g = 0.003 | | | $\sigma^*_M$ B = 75 | |

$\sigma^*_A$ and $\sigma^*_M$ of the sensors are provided as yardsticks to gauge the importance of the offsets. Offset >3$\sigma^*$ are printed in bold, and considered non-negligible.

Tool A has a large offset on the z-accelerometer and a moderate one on the x-magnetometer. Tool B has moderate offsets on the x- and y-magnetometers, and a large offset on the z-magnetometer, indicating the existence of magnetic hot spots in the tool.

The standard deviation of $\Delta g/g$, $\Delta B/B$ and $\Delta \sin I$, where $\Delta g$, $\Delta B$ and $\Delta \sin I$ are the differences between the measured values of g, B and sin I and their known values, are shown in Table 2.

TABLE 2

| | | $\sigma^*_g$ (%) | $\sigma^*_B$ | $\sigma_{sinI}$ |
|---|---|---|---|---|
| A | before | 0.25 | 0.40 | 0.0030 |
| | after | 0.04 | 0.18 | 0.0017 |
| B | before | 0.08 | 1.45 | 0.0018 |
| | after | 0.05 | 0.21 | 0.0029 |
| Theoretical | | 0.03 | 0.15 | 0.0008 |

In Table 2, the row 'Theoretical' gives the value to be expected if the noise intrinsic to the sensors and its electronics is the only source of uncertainty in the measurement, i.e. the tool is perfectly calibrated and the fields g and B are uniform and constant. Table 5 below shows that $\sigma^*_g = \sigma^*_A$, $\sigma^*_B = \sigma^*_B$ and $\sigma_{sinI} = \cos/(\sigma^{*2}_A + \sigma^{*2}_M)^{1/2}$.

The theoretical values are minimum values that are almost impossible to achieve in practice. Actual measurements would include additional uncertainty from imperfect calibration and/or offset removal, alignment errors in assembling the tools in the toolstring, variations of the magnetic field in the case of magnetometers, and imperfect removal of tool acceleration for accelerometers. Nevertheless, they make it possible to gauge if the $\sigma$'s obtained for the log measurements are reasonable. In Table 2, measured values exceeding four times the theoretical minimum are printed in bold and considered as unacceptably large, namely $\sigma^*_g$ for tool A, and $\sigma^*_B$ for tool B before offset correction. However, after offset correction, all the $\sigma$'s are all at an acceptable level.

$\sigma^*_g$, $\sigma^*_B$ and $\sigma_{sinI}$ listed in Table 2 are in effect the quantities minimized to estimate the offsets. However, since $\sigma^*_g$, $\sigma^*_B$ and $\sigma^*_{sinI}$ are minimized as a whole, it is possible for one (or even two) of the $\sigma$'s to increase after correction, if it is compensated by a decrease in another $\sigma$. $\sigma_{sinI}$ for tool B is a case in point. The fact that $\sigma_{sinI}$ increases after offset correction does not mean that there is necessarily a problem. The logs of $\Delta g/g$, $\Delta B/B$ and $\Delta \sin I$ will need to be examined to make clear if in fact the offset correction has improved the measured values of g, B and sin I.

Figure 4:
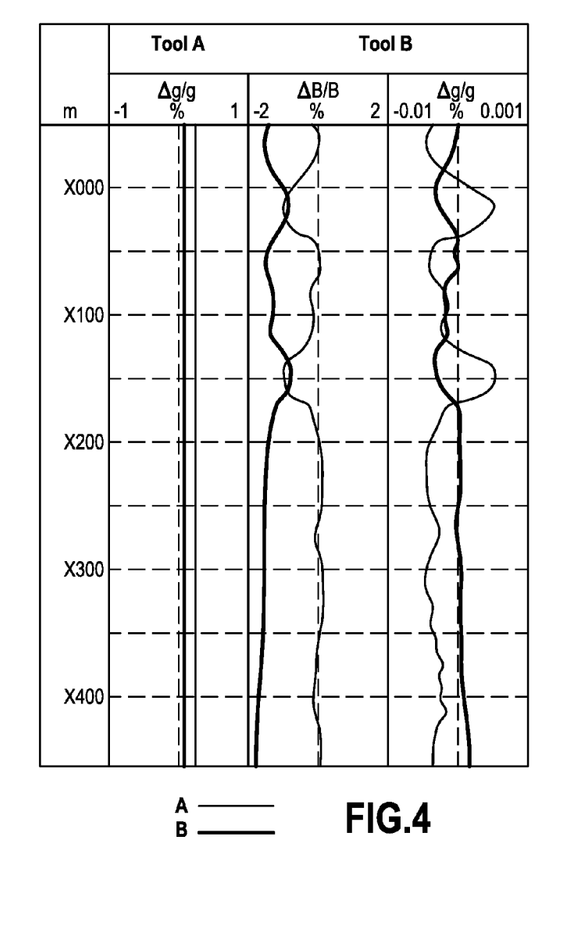
FIGS. 4 and 5, show the logs of Δg/g, ΔB/B and Δ sin I, respectively before and after offset correction.
Figure 5:
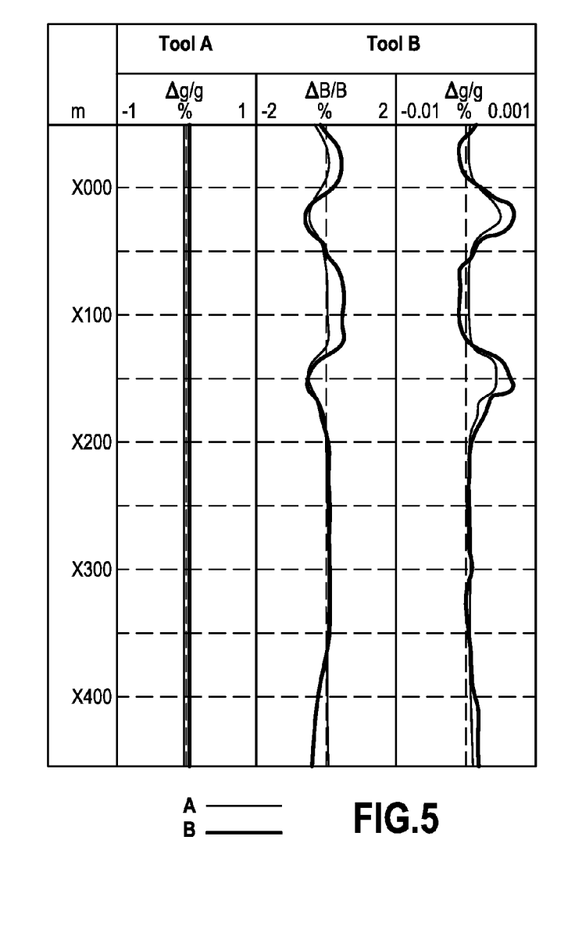

FIGS. 4 and 5, show the logs of $\Delta g/g$, $\Delta B/B$ and $\Delta \sin I$, respectively before and after offset correction. In reducing the $\Delta$'s to acceptable levels (notably $\Delta g$ for tool A and $\Delta B$ for tool B), the offset correction also brings the curves from the two tools into close agreement.

FIG. 4 shows the difference ($\Delta$) between the logged values of g, B and sin I and their known values, before offset correction. The curves are marked A for commercial tool A and B for prototype tool B. Before correction, the $\Delta B$ and $\Delta \sin I$ curves from the two tools are so different that it is unclear what the actual values of B and sin I are.

FIG. 5 shows the corresponding plote to FIG. 4 after offset correction with a scale change for the $\Delta B/B$ track. After correction, the difference between the curves is $\leq 0.2\%$ for B and $\leq 0.002$ for sin I, just higher than the theoretical minimum given in Table 2. The two tools may now be considered as measuring the actual values of B and sin I to within ±0.2% and ±0.002 respectively. Consequently, the two short intervals at X025 m and X160 m, where B is reduced by 0.3% and sin I is increased by 0.005, indicate the presence of magnetized material, in the formation or the borehole.

Since it is concluded that the $\Delta \sin I$ curve for tool B is reading closer to the truth after offset correction, the increase of $\sigma_{sinI}$ (rms average of $\Delta \sin I$) remarked upon above can only be an accident. In fact, it appears from FIGS. 4 and 5 that before offset correction, the distortion to the $\Delta \sin I$ curve caused by the offsets are (quite by chance) in an opposite direction to the effects of the variable magnetic field, leading to reduced $\sigma_{sinI}$ before offset correction.

Figure 6:
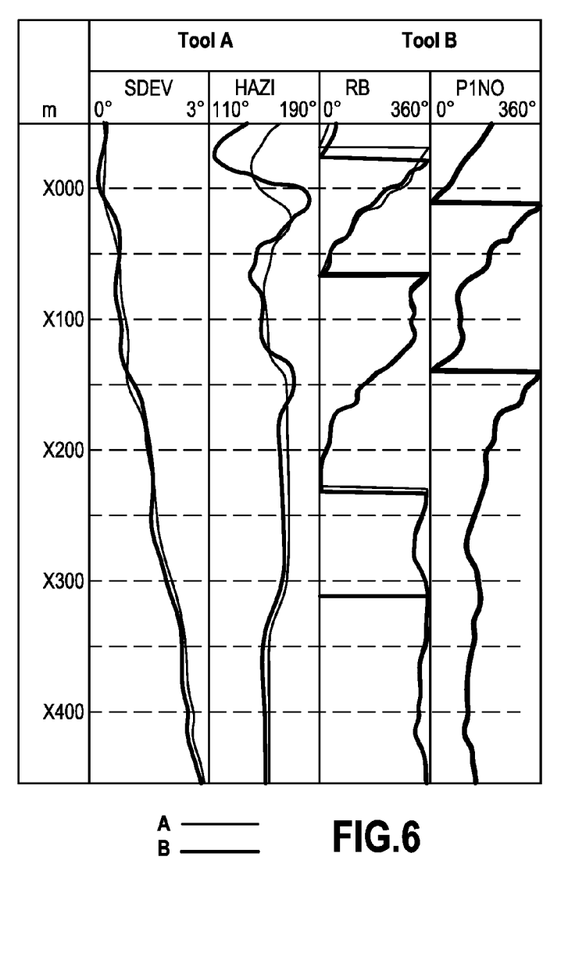
FIGS. 6 and 7 show the tool angles measured by two tools, before and after offset correction.
Figure 7:
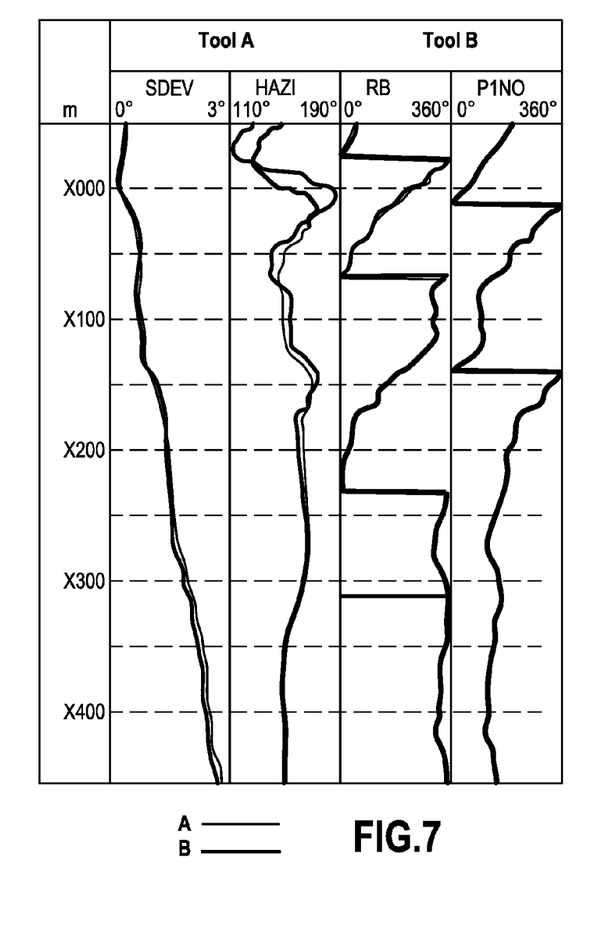

FIGS. 6 and 7 show the tool angle curves A and B (from tools A and B on the same toolstring):

SDEV—the sonde deviation,
HAZI—the sonde or hole azimuth,
RB—tool rotation measured from top-of-hole, and
P1NO—tool rotation measured from North, as measured by the two tools, before and after offset correction. The meaning of these angles is explained above.

As is discussed below, the theoretical minimum for $\sigma_{RB}$ and $\sigma_{HAZI}$ increase to infinity as hole deviation approaches 0. On the other hand, $\sigma_{SDEV}$ is independent of hole deviation, and $\sigma_{P1NO}$ is approximately constant for deviations up to say 10°. This behavior is observed in FIGS. 6 (before offset correction) and 7 (after offset correction): the difference between the measurements from the two tools appears to be roughly constant for SDEV and P1NO as SDEV increases from 0° to 3°, whereas the differences in HAZI and RB decrease from values exceeding 20° (for deviation <0.2°) to a value too small to discern on these figures (for deviation >1.5°).

Figure 8:
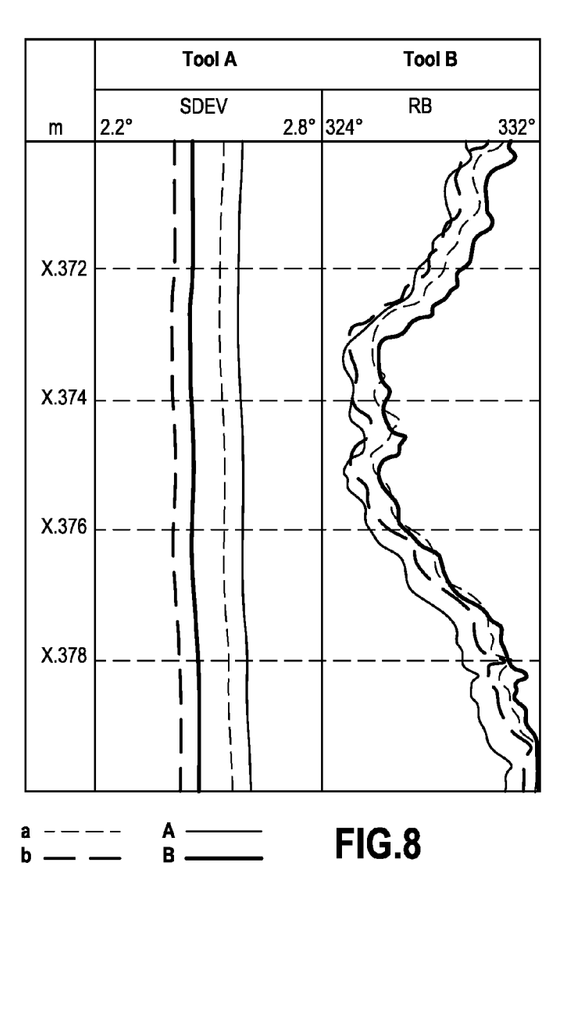
FIGS. 8 and 9 a show detail from a 10 m interval of the measurement in FIGS. 6 and 7.
Figure 9:
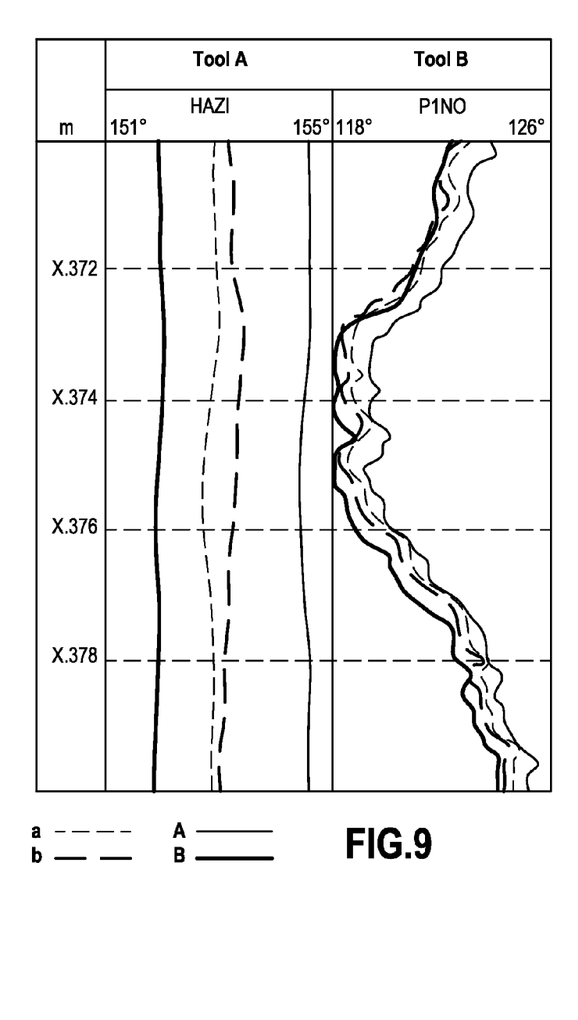

To observe the small differences between the tool curves, before and after offset correction, FIGS. 8 and 9a show detail from a 10 m interval from X370 to X380 m. FIG. 8 shows the tool angles SDEV and RB, measured by two tools on the same toolstring. The lines A, B and a, b correspond to the curves before and after offset correction respectively. FIG. 9 shows the tool angles HAZI and P1NO from two tools on the same toolstring. The lines A, B and a, b correspond to the curves before and after offset correction respectively.

The difference between curves as obtained from the two tools, $\Delta_{Tools}$, as observed in FIGS. 8 and 9 are summarized in Table 3 which shows a comparison of $\Delta_{Tools}$, before and after offset correction and $\sigma_{Theoretical}$ from X370 to X380. $\sigma_{Theoretical}$ for the tool angles, evaluated using the expressions given above, are also listed. In the short section from X370 to X380 m, average hole deviation is 2.5° and average hole azimuth is 153°. Here the hole deviation is large enough for RB and HAZI to behave normally. (see FIGS. 10 and 11 discussed below).

TABLE 3

| | $\Delta_{Tools}$ | | |
|---|---|---|---|
| | before | after | $\sigma_{Theoretical}$ |
| SDEV | 0.2° | 0.2° | 0.2° |
| HAZI | 2.5° | 1.0° | 0.42° |
| RB | 2.0° | 1.0° | 0.44° |
| P1NO | 1.5° | 0.3° | 0.14° |

In FIGS. 8 and 9, it is observed that SDEV changes by about 0.05° before and after offset correction for either tool. However, the difference between the curves remains on average unchanged at just under 0.2°. In other words, offset correction has almost no effects on the SDEV curves in this example. In Table 3, $\sigma_{Theoretical}$ for $\sigma_{SDEV}$ is 0.2°, so the agreement between SDEV from the two tools is already close to the theoretical minimum before offset correction.

For the other curves, offset correction made important changes. For HAZI and P1NO, offset correction reduces the difference between the tools by a factor of 3-5; for RB, the reduction is up to two times. After correction, the differences between the curves from the two tools are between two and three times the theoretical minimum.

The changes produced by the offset correction on a given tool are of no great significance in themselves: they reflect simply the size of the offsets on the tool. In comparing two tools after correction, the level of agreement would indicate the residual uncertainty in the measurement.

In making the offset correction, errors in the scaling factors and misalignment angles of the sensors, due to errors in the calibration process, or changes to these parameters in the borehole, and also errors in aligning the tool itself when assembling the toolstring (including bending of the toolstring) are ignored. These errors are present without any doubt, but they can be ignored if they are small. To a large extent, tolerances in the design of the tools control the size of these errors. Having found differences from the two tools run in the same toolstring that are between two and three times $\sigma^*_{Theoretical}$, there confirmation, in the example shown, that these errors are small, having an effect roughly the same in magnitude as those arising from $\sigma^*_A$ and $\sigma^*_M$.

In the example, it is shown that after correction for the sensor offsets, the differences in tool angles as measured by the two tools are reduced to levels close to the theoretical limit imposed by the σ's of the sensors and their electronics, and the hole trajectory. It is assumed that these levels of repeatability imply that both tools are reading the ground truth, to within two or three times the theoretical uncertainty of the tool.

Similar results are obtained in a small number of experiments where two tools are run in the same toolstring. In routine jobs when only one tool is run, the offset correction will in principle produce the same improvement in data quality although there is no direct verification by repeatability.

The uncertainties in the tool angles that apply in a typical log are summarized in Table 4 which shows uncertainties in measured tool angles. They include the uncertainties arising discussed above, imperfections of the offset correction itself, the uncertainty of the sensors and their electronics, and environmental effects such as irregular tool motion and variations of the magnetic field. Uncertainty in the magnetic declination is however ignored.

In Table 4, the dependence of the σ's on magnetic inclination (equivalently latitude, I<80°≅magnetic latitude of <70°), and the increase of $\sigma_{HAZI}$ and $\sigma_{RB}$ as deviation approaches 0°, and of $\sigma_{P1NO}$ as deviation approaches 90°, have been accounted for, as described below.

TABLE 4

| | $\sigma_{log}$ | Comments |
|---|---|---|
| SDEV | 0.2° | all SDEV |
| HAZI | 1.0° | SDEV >2.5°, I<80° |
| RB | 1.0° | SDEV >2.5°, I<80° |
| P1NO | 1.0° | SDEV <30°, I<80° |

The simplicity and robustness of the offset correction have obvious implications for log quality control. A procedure for log quality control can be setup as follows:

1. After each log, compute of the sensor offsets. As there are no adjustable parameters in the calculation, this can be done automatically.

2. If $\sigma_g$, $\sigma_B$ and $\sigma_{sinI}$ are reduced to acceptably low values, then it can be concluded that the tool does not have problems other than sensor offsets. Furthermore, if there are significant differences between the tool angles before and after correction, the offsets are corrected and compute a new set of corrected logs.

3. If $\sigma_g$, $\sigma_B$ and $\sigma_{sinI}$ cannot be reduced to acceptably low values, it is concluded that there is some other problem with the tool. The operator can be alerted to check and repair the tool as necessary, and forward the data to a data processing center for data repair, if possible.

(It is possible to repair data in certain simple cases, such as when one sensor is lost or if the scaling factor of one sensor is incorrect. However, such a repair, unlike the offset correction, would require the intervention of a log analyst: to diagnose the problem, carry out the repair, and verify that the results are satisfactory.)

Using the described method to correct for the in situ offsets on triaxial accelerometers and magnetometers in wireline logs, systematic errors such as offsets can be removed to allow instruments to perform closer to their theoretical limits.

If the tool is perfectly calibrated, and the fields g and B are constant and uniform, the uncertainty in the measured values of g, B, sinI, and the tool angles would arise from the uncertainty of the accelerometer and magnetometer measurements only. Expressions for these minimum theoretical uncertainties can be derived from the expressions for the measured quantities, assuming that errors from different sensors are uncorrelated. They are given in Table 5 which shows theoretical σ for a perfectly calibrated tool and constant, uniform fields. $\sigma_g/g$, $\sigma_B/B$ and $\sigma_{sinI}$ are dimensionless. σ for the angles are in radians.

TABLE 5

| | $\sigma = \sqrt{P\sigma_A^{*2} + Q\sigma_M^{*2}}$ | |
|---|---|---|
| | P | Q |
| $\sigma_g/g$ | 1 | 0 |
| $\sigma_B/B$ | 0 | 1 |
| $\sigma_{sinI}$ | $\cos^2 I$ | $\cos^2 I$ |
| $\sigma_{SDEV}$ | 1 | 0 |
| $\sigma_{HAZI}$ | $\cos^2\phi(\sin^{-2}\theta - \cos^2\phi) - 2\cos\phi \tan I/\tan\theta + \tan^2 I$ | $1/\sin^2 I$ |
| $\sigma_{RB}$ | $1/\sin\theta$ | 0 |
| $\sigma_{P1NO}$ | $(R - S^2)/(R^*\cos I)^2$<br>$R = \cos^2\theta + \sin^2\theta \cos^2\phi$<br>$S = \cos\theta \cos I - \sin\theta \cos\phi \sin I$ | $\cos\theta/(R^*\cos I)^2$ |

Here $\sigma^*_A$ (~0.0003) and $\sigma^*_M$ (~0.0015) are the σ's of the accelerometers and magnetometers inclusive of the effects averaging during a log, in units where g=1 and B=1. θ and φ are respectively the hole deviation and hole azimuth. Magnetic deviation is set to 0 for simplicity.

$\sigma^*_g$, $\sigma^*_B$ and $\sigma_{SDEV}$ are constants independent of well trajectory and magnetic inclination and $\sigma_{sinI}$ depends only on I. These expressions are well behaved for all well trajectories and latitudes, so that g, B, sinI and SDEV are measurable in all wells.

Figure 10:
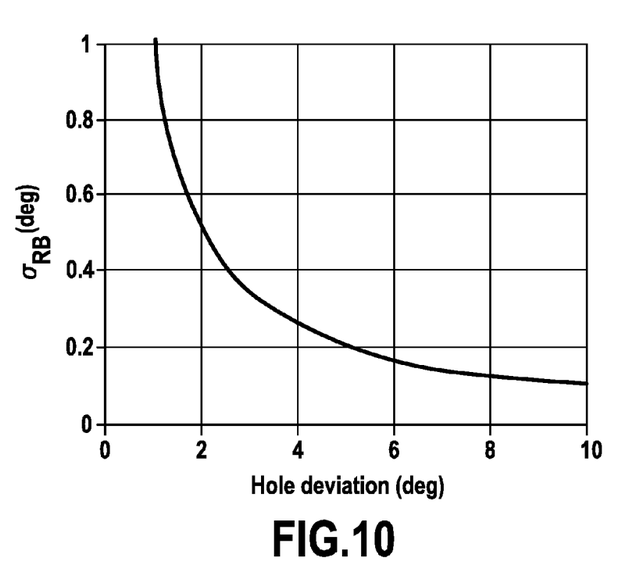
FIG. 10 shows the standard deviation of RB as a function of hole deviation.
Figure 11:
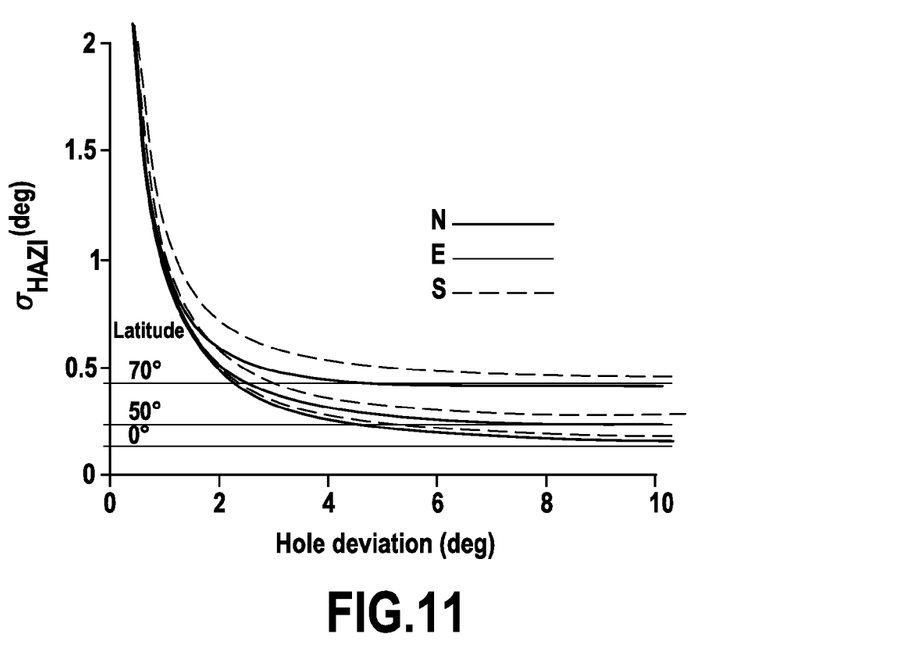
FIG. 11 shows the standard deviation of HAZI as a function of hole deviation, hole azimuth (N, E, S) and latitude.
Figure 12:
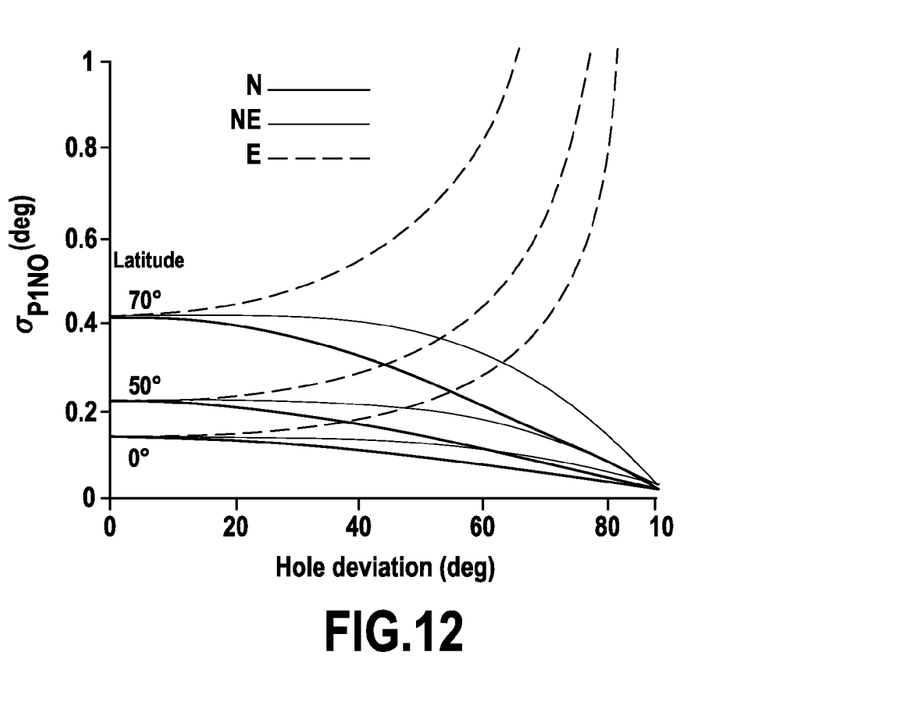
FIG. 12 shows the standard deviation of P1NO as a function of hole deviation, hole azimuth (N, NE, E) and magnetic latitude.

The presence of sin θ, tan θ and cos I in the denominator of some of the terms imply that $\sigma_{RB}$, $\sigma_{HAZI}$ and $\sigma_{P1NO}$ will blow up under the circumstances mentioned earlier. FIGS. 10-12 illustrate the singular behavior of $\sigma_{RB}$, $\sigma_{HAZI}$ and $\sigma_{P1NO}$ relative to hole deviation θ. It is understood that $\sigma_{HAZI}$ and $\sigma_{P1NO}$ will also be singular as I approaches 90°. FIG. 10 shows the standard deviation of RB as a function of hole deviation. The singularity as θ→0 exists at all hole azimuths. FIG. 11 shows the standard deviation of HAZI as a function of hole deviation, hole azimuth (N, E, S) and latitude. The singularity as θ→0 exists at all hole azimuths except E and W. FIG. 12 shows the standard deviation of P1NO as a function of hole deviation, hole azimuth (N, NE, E) and magnetic latitude. The singularity as θ→90° exists only when hole azimuth is close to E or W.

The fact that σHAZI remains finite as hole deviation approaches 0 (for I<90°), when hole azimuth is exactly E or W, is a mathematical oddity. In effect, even when hole azimuth is a fraction of a degree different from these two directions, $\sigma_{HAZI}$ will blow up as hole deviation approaches 0. So in practice, we can assume that $\sigma_{HAZI}$ blows up for all hole azimuths as hole deviation approaches 0.

The origin of these singularities is mathematical: in the way the angles are defined. One cannot build a better tool to avoid them. The onset of unacceptable behavior can be delayed by reducing $\sigma_A$ and $\sigma_M$, but given the steepness of the curves near the singularities, improving $\sigma_A$ and $\sigma_M$ by a factor of 10, even if it were feasible, would gain perhaps a few tenths of a degree before the uncertainties in the tool angles become unacceptably large. In fact it makes no sense to improve $\sigma_A$ and $\sigma_M$ when errors due to sensor calibration, tool alignment etc cannot be reduced in proportion.

The invention claimed is:

1. A method of correcting accelerometer and magnetometer measurements made in a well, comprising: making a series of triaxial magnetometer measurements (Mx, My, Mz) and a series of triaxial accelerometer measurements (Ax, Av, Az) at N positions in an interval of the well to derive measured values of gravitational acceleration g, magnetic field intensity B and the sine of a magnetic inclination sinI; obtaining known values of g, B and sinI for each measured position N in the interval; determining a accelerometer measurement offset ΔA and a magnetometer measurement offset ΔM to be applied across the measured interval of the well, wherein ΔA comprises three accelerometer corrections (ΔAx, ΔAy, ΔAz) and ΔM comprises three magnetometer corrections (ΔMx, ΔMy, ΔMz), by simultaneously minimizing the root-mean-square difference between the series of measured values of g, B and sinI and the known values of g, B and sinI across all measured positions N in the interval; and applying the accelerometer measurement offset ΔA and the magnetometer measurement offset ΔM across the measured interval of the well to determine in situ corrected accelerometer and magnetometer measurements, wherein the corrected accelerometer and magnetometer measurements are given by $$A' = A - \Delta A = (A_x - \Delta A_x, A_y - \Delta A_y, A_z - \Delta A_z),$$

$$M' = M - \Delta M = (M_x - \Delta M_x, M_y - \Delta M_y, M_z - \Delta M_z),$$

and the measured values of g, B and sinI by $$|A'| = \sqrt{(A'^2_x + A'^2_y + A'^2_z)},$$

$$|M'| = \sqrt{(M'^2_x + M'^2_y + M'^2_z)}, \text{ and}$$

$$A' \cdot M'/|A'||M'|,$$

the method comprising determining offsets ΔA=(ΔAx, ΔAy, ΔAz) and ΔM=(ΔMx, ΔMy, ΔMz) that will simultaneously minimize the root-mean-square difference between the measured and known values of g, B and sinI, wherein the offsets ΔA and ΔM are obtained by minimizing the cost function:

$$\chi = \sigma^{*2}_g + \sigma^{*2}_B + \sigma^2_{sinI} + \Lambda^2_A + \Lambda^2_M$$

where $$\sigma^*_g = \sqrt{[\Sigma(1 - |A'|/g)^2/N]},$$

$$\sigma^*_B = \sqrt{[\Sigma(1 - |M'|/B)^2/N]},$$

$$\sigma_{sinI} = \sqrt{[\Sigma(sinI - A' \cdot M'/|A'||M'|)^2/N]},$$

(Σ represents a sum over N depth levels)
are the standard deviation of the measured g, B and sinI and
* indicates that the values are expressed as fractions of the reference values, and the terms:

$$\Lambda^2_A = (a_g \sigma^*_{g\ Theoretical}/\sigma^*_g)^2 |\Delta A|^2/g^2,$$

and $$\Lambda^2_M = (a_B \sigma^*_{B\ Theoretical}/\sigma^*_B)^2 |\Delta M|^2/B^2$$

are used so that if two solutions give the same fit in the absence of these terms, the one whose offset vector has the smaller magnitude is preferred.

* * * * *